United States Patent
Ribero

(10) Patent No.: US 9,404,570 B2
(45) Date of Patent: Aug. 2, 2016

(54) CONTROL METHOD FOR AN AUTOMATED GEARBOX OF AN AUTOMOTIVE VEHICLE, SYSTEM FOR CONTROLLING SUCH A GEARBOX AND AUTOMOTIVE VEHICLE EQUIPPED WITH SUCH A SYSTEM

(75) Inventor: Raphael Ribero, Millery (FR)

(73) Assignee: Renault Trucks, St. Priest (FR)

( * ) Notice: Subject to any disclaimer, the term of this patent is extended or adjusted under 35 U.S.C. 154(b) by 179 days.

(21) Appl. No.: 14/359,281

(22) PCT Filed: Dec. 15, 2011

(86) PCT No.: PCT/IB2011/003248
§ 371 (c)(1),
(2), (4) Date: May 19, 2014

(87) PCT Pub. No.: WO2013/088189
PCT Pub. Date: Jun. 20, 2013

(65) Prior Publication Data
US 2014/0336888 A1 Nov. 13, 2014

(51) Int. Cl.
*F16H 61/02* (2006.01)
*F16H 59/00* (2006.01)

(52) U.S. Cl.
CPC ....... *F16H 61/0213* (2013.01); *B60Y 2300/182* (2013.01); *B60Y 2400/92* (2013.01); *F16H 2059/003* (2013.01)

(58) Field of Classification Search
None
See application file for complete search history.

(56) References Cited

U.S. PATENT DOCUMENTS

| 5,954,617 | A | 9/1999 | Horgan et al. | |
|---|---|---|---|---|
| 2001/0023385 | A1* | 9/2001 | Nishimura | B60W 10/02 701/51 |
| 2002/0028727 | A1* | 3/2002 | Iida | F16H 61/0213 477/125 |
| 2004/0073348 | A1* | 4/2004 | Stragapede | F16H 61/0248 701/51 |
| 2010/0063697 | A1 | 3/2010 | Lindgren et al. | |

FOREIGN PATENT DOCUMENTS

| GB | 2328480 A | 2/1999 |
|---|---|---|
| WO | 2008078088 A1 | 7/2008 |

OTHER PUBLICATIONS

International Search Report Sep. 6, 2013 for corresponding International App. PCT/IB2011/003248.

* cited by examiner

*Primary Examiner* — Edwin A Young
(74) *Attorney, Agent, or Firm* — WRB-IP LLP

(57) ABSTRACT

A method is provided for controlling an automated gearbox of an automotive vehicle that is adapted to work in a first automatic mode and at least one second driver initiated mode which is different from the first mode. This method includes monitoring the vehicle driving behavior is monitored, analyzing the vehicle driving behavior is and determining it to be satisfactory or non satisfactory and, when the driver requests switch of the automatic gearbox from the first mode to the second mode, the switch order is followed only if the vehicle driving behavior is determined to be satisfactory, and/or, when the automated gearbox is in a second driver initiated mode, causing a switch of the gearbox to a first automatic mode if the vehicle driving behavior is determined to be non-satisfactory. The system includes an arrangement to automatically perform these steps.

15 Claims, 2 Drawing Sheets

CONTROL METHOD FOR AN AUTOMATED GEARBOX OF AN AUTOMOTIVE VEHICLE, SYSTEM FOR CONTROLLING SUCH A GEARBOX AND AUTOMOTIVE VEHICLE EQUIPPED WITH SUCH A SYSTEM

BACKGROUND AND SUMMARY

This invention relates to a method and a system for controlling on automotive gearbox of an automotive vehicle. This invention also relates to an automotive vehicle equipped with such a system.

In the field of automotive vehicles, it is known to take into account the behaviour of a driver in order to provide him or her with more or less freedom to operate a vehicle. For instance, FR-A-2 849 251 discloses a device which progressively reduces the speed of a vehicle, in case the behaviour of the driver is not satisfactory. WO-A-2008/078088 suggests modifying a function of at least one system of a vehicle, depending on whether or not this vehicle runs under the speed limit applicable to one road. U.S. Pat. No. 5,954,617 follows a similar approach where the engine performance of a vehicle is influenced by the driver's behaviour. In particular, RPM limits of an automatic gearbox can be progressively shifted or modified in case of undesirable driver performance. These approaches reduce the functionality of a vehicle in case of driver misbehaviour, which might be problematic in some occurrences when the disabled function would be necessary, for example for a truck whose speed cannot be reduced below a preset value.

On the other hand, automated gearboxes are known and sometimes mounted on vehicles like trucks. Some of these gearboxes can work in a first full automatic mode, where the gears are automatically controlled according to preset rules. These gearboxes can also sometimes work in one or several driver initiated mode(s) where, in most cases, a higher power output can be obtained from the engine of the vehicle. Such specific modes can be used in special conditions, in particular when a high torque is needed to overtake another vehicle or when the vehicle runs on an uneven surface, such as on a construction site.

It is desirable to provide a new and alternative method for efficiently controlling an automated gearbox of an automotive vehicle, which takes into account the driver's behaviour.

To this end, an aspect of the invention concerns a control method for an automated gearbox of an automotive vehicle, this gearbox being adapted to work in a first automatic mode and in at least one second driver initiated mode, which is different from the first mode. According to an aspect of the invention, this method includes at least a first step a) where the vehicle driving behaviour is monitored, a second step b) where the vehicle driving behaviour is analyzed and determined to be satisfactory or non satisfactory and a third step c) where, when the driver requests switch of the automatic gearbox from the first mode to the second mode, the switch order is followed only if, in step b), the vehicle driving behaviour is determined to be satisfactory; and/or when the automated gearbox is in a second driver initiated mode, causing a switch of the gearbox to a first automatic mode if, in step b), the vehicle driving behaviour is determined to be non-satisfactory (B=NOK).

Thanks to an aspect of the invention, it is possible to modify the global response of a vehicle to the driver's requests, without acting on the engine itself or the maximum speed of the vehicle, thanks to the control of the switch of the automated gearbox, from its first automatic mode, which is a default mode, to one of the second driver initiated modes and/or by forcibly causing the gearbox to be switched back from the second mode to the first mode. Of course, it is possible to provide that such access limitation steps may be ignored by the system or may be overruled by the driver, for example for safety concerns.

According to further aspects of the invention which are advantageous but not compulsory, such a method may incorporate one or several of the following features:
- In step a), monitoring of the vehicle driving behaviour is made on the basis of at least one parameter representative of at least one of the following quantities; instantaneous and/or average fuel consumption, engine speed and/or torque, accelerator pedal and/or brake pedal and/or steering wheel movements speed and/or amplitude, brake torque and/or brake phases, intervention of ABS and/or ESP and/or ASR systems, vehicle yaw rate, vehicle speed as compared to a speed limit, distance to a preceding vehicle.
- In step a), monitoring of the vehicle driving behaviour can be made on the basis of data collected on the observance of traffic rules.
- The second driver initiated mode can be selected amongst the following modes: accelerator pedal kick down mode, manual mode, temporary manual mode, power/construction mode.
- Steps a) and b) can be implemented continuously during a vehicle journey or step b) can be automatically implemented when a request is received to switch the automated gearbox from its first mode to its second mode.
- If switch of the automatic gearbox is requested and the vehicle driving behaviour is determined to be non satisfactory, a warning message can be sent to the driver.
- As long as the vehicle driving behaviour is determined to be non-satisfactory in step b), blocking of any switch order occurs and, if the vehicle driving behaviour is later determined to be satisfactory, a switch order can be followed, as long as the vehicle driving behaviour is determined to be satisfactory.
- When the vehicle driving behaviour is determined to be non-satisfactory in step b), blocking of any switch order may occur for at least a given period of time or for a given distance.

The invention also concerns a system which enables implementation of the here-above mentioned method. Such a system is for controlling an automated gearbox of an automotive vehicle, this gearbox being adapted to work in a first automatic mode and at least one second driver initiated mode which is different from the first mode. According to the invention, this system includes first means to automatically monitor the vehicle driving behaviour, second means to automatically assess whether or not this behaviour is satisfactory and third means to automatically and selectively block an order to switch the automated gearbox from its first mode to its second mode and/or to automatically and selectively switch back the gearbox from the second mode to the first mode, on the basis of an output of the second means.

According to further advantageous but not compulsory aspects of the invention, such a system can incorporate one or several of the following features:
- The automatic gearbox can be an automated manual transmission device, an automatic gearbox or a continuous variable transmission.
- The first, second and third means can be included in an electric, control unit, Finally, the invention concerns an automotive vehicle, in particular a truck, equipped with a system for controlling its automated gearbox as mentioned here-above.

BRIEF DESCRIPTION OF THE DRAWINGS

This invention will now be explained in correspondence with the following figures as an illustrative example and without restricting its object. In the annexed figures.

DETAILED DESCRIPTION

Figure 1:
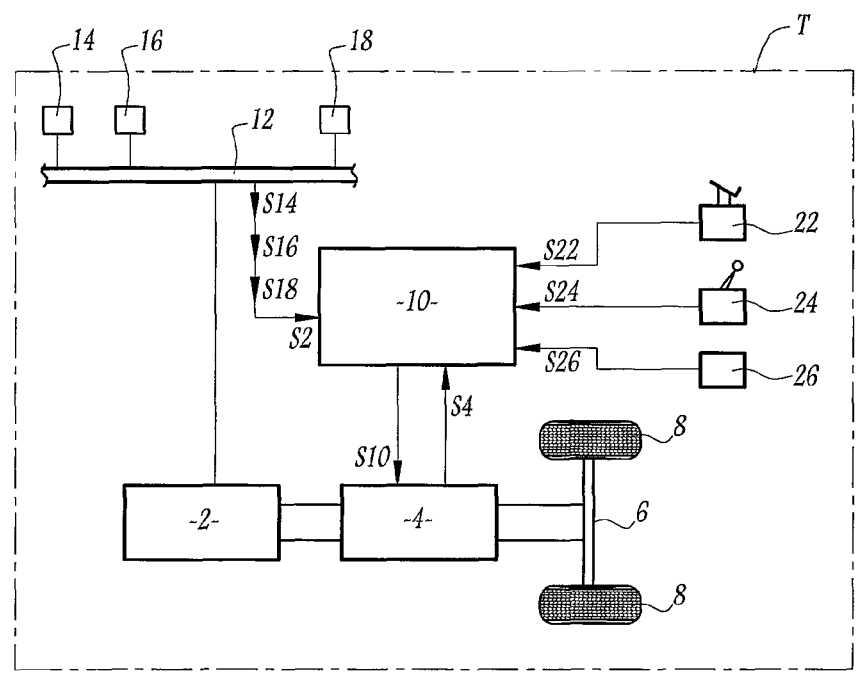
FIG. 1 is a schematic representation of a system according to the invention installed onboard a truck.

On FIG. 1 sonic parts of a truck T are schematically represented. These parts include a main drive engine, for example an internal combustion engine 2, an automated gearbox 4 and a rear driven axle 6 equipped with two wheels 8.

In the further described embodiment, the automated gearbox can be of the type commonly called automated manual transmission 4 for transmitting the output torque of internal combustion engine 2 to axle 6. This device is sometimes called "AMT gearbox" or "robotized gearbox". It refers to a gearbox which is very close in structure to a manual gearbox but where one or several actuators are provided to cause the movement of internal mechanisms of the gearbox causing the shift from one gear ratio to the other.

Truck 2 also includes an electronic control unit or ECU 10 adapted to control gearbox 4, thanks to an electronic signal S10. In the case of the AMT, the ECU controls the gearbox actuators, which can for example be hydraulic or electric. A feedback signal S4 is preferably provided by AMT gearbox 4 to ECU 10, so as to obtain a closed control loop.

ECU 10 is preferably connected, amongst others, to the controller area network or CAN 12 of truck T which conveys information with respect to the working parameters of truck T. In particular, network 12 conveys information as to the working conditions of internal combustion engine 2.

Several sensors and control units may be connected to network 12, including a vehicle yaw rate sensor 14, an ABS/ESP control unit 16 and a brake control unit 18. Thus, the output signals S14, S16 and S18 of sensors or control units 14, 16 and 18 can be conveyed to ECU 10 via network 12. Alternatively or in addition, one or several sensor or control units can be connected to the ECU 10 directly by a dedicated communication line.

The connection of internal combustion engine 2 to network 12 provides ECU 10 with sonic information with respect to the working condition of this engine, in particular its output torque and its fuel consumption, in the form of another signal S2.

Truck T may also include an accelerator pedal 22, a control input device, which can be in the form of a lever 24, and a manual shifting input device 26 which can be in the form of a shift lever and/or of small levers or "palettes" mounted next to the steering wheel of truck T. Preferably, these input devices are equipped with sensors/detectors which are connected to ECU 10 and adapted to provide this ECU with respective electric control signals S22, S24 and S26 upon the actuation of the respective input device by the driver.

According, to a non-represented embodiment of the invention, one or several of pedal 22, device 24 and/or set 26 can be connected to ECU 10 via network 12.

ECU 10 is adapted to control gearbox 4 on the basis of signals S22, S24 and S26 and of information gathered on network 12.

Gearbox 4 can work in a first full automatic mode where gear shifts are controlled by ECU 10 on the basis of preset rules, without any direct input from the driver. This is the default mode for gearbox 4. But the gearbox can also work in at least one second mode which is driver initiated. Such second mode is driver initiated because the driver needs to perform a specific action to cause the performance of such second mode. In the second mode, the gear shifting may remain automatic, but would then be subject to a set of shifting rules differing from those applied in the first mode. In the second mode, the gear shifting can be "manual", i.e. caused at least in most cases by a specific action of the driver, for example using the shifting input device 26.

A first example of such a second mode can be a so-called "power" mode, with modified rules for gear shifts. In this power mode, gears shift from a low gear to a high gear occurs at an engine rotation speed or RPM higher than in the first mode. This enables the driver to obtain more power on the rear axle 6 when needed, for instance in order to overtake another vehicle. Such a power mode can be obtained by the driver via a sudden effort or "kick down" effort on pedal 22. This mode is also called "accelerator pedal kick down mode". In other words, in case of a sudden effort on pedal 22, its output signal S22 is interpreted by ECU 10 as a request to switch from the first mode to the second power mode. Such "kick down" differs from a normal actuation of the accelerator pedal 22.

Set 26 of levers, or other shifting input device, is intended to allow the driver to manually control gearbox 4 via ECU 10, thanks to signal S26. Control of gearbox via set 26 occurs in a second mode which can be called "manual". Switching from the first automatic mode to this manual mode can be for example obtained via the driver actuating the control device 24 which sends an appropriate signal S24 to ECU 10, when needed. Once this signal S24 has been received and properly treated by ECU, to switch to manual mode, it is possible to control gearbox 4 via set 26, by sending signal S26 to ECU 20.

The switch of the gearbox from the first mode to the second mode could be caused b the mere actuation of the shifting input device 26, without any need of an action on the control input device 24. Such could be the case for example for another type of second mode for gearbox 4 which can be a "temporary manual mode" where control of gearbox 4 can also be obtained via the set of levers 26, for a given period of time. Such mode may automatically end after a certain delay.

Still another possible type of second mode for gearbox 4 operation can be a mode where special rules are used to control gear shifts in a given environment, for instance when truck T runs on an uneven ground such as on a construction site where more power can be needed in some occasions, but where low vehicle speeds and slippery terrain are the norm. This mode can be called "power/construction" mode.

These four alternative modes can be used by ECU 10 to control gearbox 4 upon actuation by the driver of truck T. These four modes constitute second driver initiated modes, in the sense of this invention.

Of course, other driver initiated modes can be considered, depending on the type of the vehicle and on its working environment.

A key feature of the invention is that access to these second driver initiated modes is reserved to drivers having a behaviour which is determined as satisfactory with respect to some preset rules.

On the basis of signals received via network 12 or by other means, a control unit, which can be ECU 10, is adapted to monitor the vehicle driving behaviour that is how the driver uses the vehicle.

Monitoring of the vehicle driving behaviour can be based on the instantaneous and/or average fuel consumption of engine 2. Currently, in many vehicles, data relating to this consumption is already available on network 12. For instance, a limit value can be fixed or can be calculated according to external or internal parameter for the instantaneous fuel consumption, e.g. X liters for 100 kilometers (km). Another limit value can be fixed or calculated for the average fuel consumption, for example on the last 100 km, e.g. Y liters per 100 km.

The relevant ECU is capable of comparing the real instantaneous and average fuel consumption values to these two limit values. As an example, if both real fuel consumption values are below the limits, then the vehicle driving behaviour can be considered to be satisfactory. Otherwise, it can be considered to be non satisfactory.

Similarly, the vehicle driving behaviour can be determined to be satisfactory or not on the basis of a comparison of an actual value, obtained via network 12, to a preset or calculated limit value for the engine output torque, for the accelerator pedal movements speed and/or amplitude, the brake torque and/or brake phases, for the intervention of an ABS (anti-blocking system) and/or of an ESP (electronic stability program) and/or of an ASR (anti-slip regulation) system due to wheel blocking, skidding or slipping, and/or for the vehicle yaw rate.

Alternatively or in addition, truck T can be equipped with a positioning/navigation system which enables ECU to collect some information connected to the vehicle current location such as a speed limit applicable on the road where truck T is running. It is then possible for the relevant ECU to compare the actual speed of truck T to this limit and, on this basis, to determine if the vehicle driving behaviour is satisfactory or not.

Alternatively or in addition, some means can be provided on the front of truck T in order to estimate the distance of this truck with respect to a preceding vehicle and, on this basis and on the basis of a preset or calculated limit value, to determine if the vehicle driving behaviour is satisfactory or not.

Other ways of determining whether or not a vehicle driving behaviour is satisfactory or not can be considered. In particular, one can obtain data with respect to the observance of traffic rules by truck during a journey. This data can concern the fact that truck T passed a red traffic light or did not yield in front of another vehicle. Such information, and/or other information, can be obtained from an external server by the system through a wireless communication system, such as a telephone or satellite communication device interfaced with the system for example through network 12.

The vehicle driving behaviour can be analyzed on the basis of one of several of the parameters listed here-above which may be combined between them and/or with still other parameters such as engine speed, steering wheel movement speed or amplitude, brake pedal actuation speed or amplitude, intervention of an anti-skid system.

Figure 2:
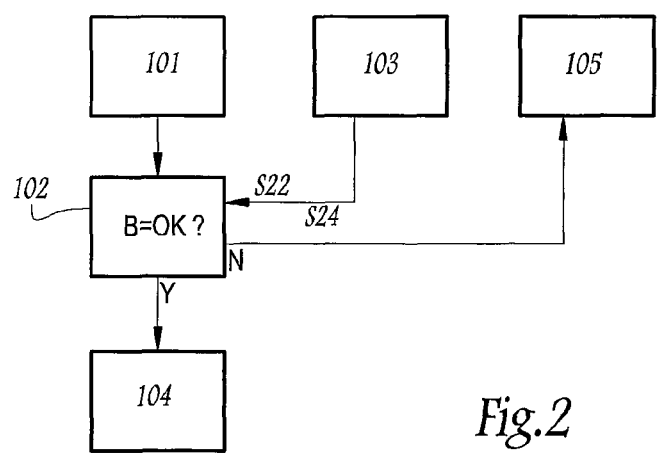
FIG. 2 is a block diagram of a method according to the invention.

Monitoring of the vehicle driving behaviour can be performed, preferably automatically and possibly continuously, during a journey of truck T, in a first step 101 of the method of the invention represented on FIG. 2. During this step 101, data is collected with respect to the actual working conditions of truck T, via some parameters as explained here-above and this set of parameters is considered to be representative of the vehicle driving behaviour of the driver.

In a second step 102, ECU 10 may automatically compare this behaviour with a reference behaviour defined by the limit values mentioned here-above, in order to determine if this behaviour is satisfactory or not.

These first two steps which comprise monitoring the driver behavior and analyzing it could at least partly be performed off-board the vehicle, for example performed by a remote server to which the vehicle can be linked by a wireless communication system.

If during a third step 103, the driver requests gearbox 4 to switch from its first automatic mode to one of the second driver initiated modes, this request is forwarded to ECU 10 for example in the form of one of signals S22, S24 or S26.

If the result of the analysis conducted in step 102 is that the behaviour is said to be satisfactory, or "OK", then the switch order is automatically implemented by ECU 10 in a fourth step 104. In other words, if the vehicle driving behaviour is determined to be satisfactory in step 102, then the request of the driver is accepted and ECU 10 switches to one of the second modes in step 104, according to the wish of a driver.

If the vehicle driving behaviour is considered to be non-satisfactory, or "NOK", then the switch order is not followed. In other words, ECU 10 automatically continues to control gearbox 4 according to the first full automatic mode. Then, the driver does not have access to the "power", "manual", "temporary manual" or "power/construction" mode that he wishes to use, or at least not to all of them. In addition, or alternatively, under such condition, if the automated gearbox was previously in a second driver initiated mode, the ECU can cause a switch of the gearbox control to the first automatic mode.

Moreover, a warning message can be sent to the driver in a step 105. This warning message can be displayed within the truck cabin, on the screen of an onboard computer.

Thus, according to the invention, the driver is aware that he can use the special modes of the gearbox only if his driving behaviour is determined to be satisfactory, along with the rules used by ECU 10 with this respect. ECU 10 includes means, in the form of one or several microchips and some memories, to perform the monitoring of the vehicle driving behaviour, assessment of whether or not this behaviour is satisfactory and selectively blocking of to switch order. Alternatively, these means can be spread over several ECUs.

Figure 3:
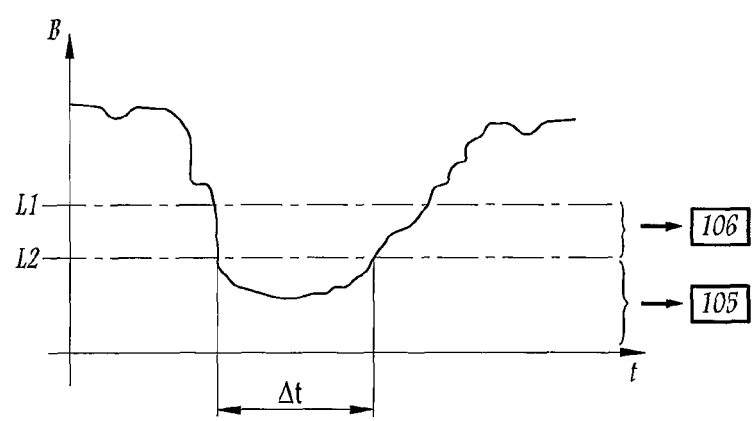
FIG. 3 is a schematic representation of a vehicle driving behaviour as a function of time over a vehicle journey.

FIG. 3 schematically represents the vehicle driving behaviour B as a function of time t during a journey of truck T. This behaviour can be represented by a so-called "grade" which is representative of one or several of the parameters mentioned here-above. A global limit L1 can be fixed for this grade of behaviour B. If, as shown on FIG. 3, the grade of behaviour B goes below a first limit value L1, then a first alarm message can be sent of the driver in order to warn him that he might lose access to at least some modes of the automated gear box if his behaviour worsens. This alarm message is displayed in the truck cabin in one step 106 of the method of the invention.

If the global behaviour grade goes below a second limit value L2, then the vehicle driving behaviour is determined to be non-satisfactory. Under such condition, any switch order initiated by the driver is blocked and a message may be sent to the truck cabin in step 105, as explained here-above. In addition, or alternatively, under such condition, if the automated gearbox was previously in a second driver initiated mode, the ECU can cause a switch of the gearbox control to a first automatic mode.

It is expected that the driver will take this information into account in order to improve his behaviour so that the vehicle driving behaviour grade increases, as shown on FIG. 3. In such a case, a switch order for gearbox to one of the second modes is blocked in a period of time ΔT corresponding to the time when the vehicle driving behaviour is determined to be non-satisfactory, with its grade below value L2.

As soon as this behaviour is said to be satisfactory, that is that its grade is above value L2, or possibly after a certain delay, it becomes possible for the driver to again use the second modes of gear box 4, as long as the behaviour grade does not fall below limit value L2.

Alternatively, ECU 10 can be programmed so that use of a second mode or its reinstatement is only possible when the vehicle driving behaviour has been improved so that its grade is above the first value L1.

According to another approach, ECU 10 can be programmed so that, when the vehicle driving behaviour is determined to be non-satisfactory in step 102, blocking of any switch order occurs at least for a given period of time, e.g. 5 min or for a given distance, e.g. 10 km, even if the vehicle driving behaviour improves over value L1 or L2 on this period or on this distance.

Also it could be provided that several "mis-behaviour" levels could be determined, and that at each level, a greater number of second modes, or a different set of second modes, could be inhibited.

A key difference between the invention and the approaches of the prior art is that one does not need to change the performances of a vehicle, but that access to some specific modes of an automated gearbox are controlled on the basis of the vehicle driving behaviour. The invention enables a fleet manager to give to several drivers some freedom to operate their respective trucks, without a need of inhibiting some special modes of an automated gearbox on all trucks, which would correspond to a "blind" functionality restriction. On the other hand, the invention tends to limit inappropriate behaviour of the drivers that would result in too important fuel consumption, high exhaust emissions, mechanical wear and shorter maintenance intervals.

The invention is not limited to the use of an AMT gearbox which is a special type of automated gearbox. It can also be implemented with other types of automated gearboxes such as an automatic gearbox, whose structure is based on a combination of epicyclical gear trains, some elements of which are locked or unlocked using clutches to determine different gear ratios. The invention can also be implemented with a continuous variable transmission or CVT. In both cases, these other kinds of automated gearboxes can normally work in different modes. Access to at least one of these modes can be allowed or prevented, depending on the vehicle driving behaviour.

According to one aspect of the invention which is applicable for all embodiments, access limitation to the special or second driver initiated mode(s) of the automated gearbox can be overruled in case of an emergency situation, e.g. by the driver pressing an appropriate button on the dashboard of the vehicle and/or automatically if the system detects a compromised safety situation. Such overruling would preferably be logged and would preferably be possible only a limited number of times.

The invention has been represented when used onboard a truck. It can also be used onboard other automotive vehicles, such as personal cars, tractors. etc.

The invention claimed is:

1. A control method for an automated gearbox of an automotive vehicle, the gearbox being adapted to work in:
   a first automatic mode
   at least one second driver initiated mode which is different from the first mode wherein the method includes at least the following steps:
   a) monitoring the vehicle driving behaviour,
   b) analyzing the vehicle driving behaviour and determining if the driving behavior is below a first limit value or a second limit value, wherein a first alarm message is sent to the driver below the first limit value, and wherein the vehicle driving behavior is determined to be satisfactory above the second limit value and non-satisfactory below the second limit value, and
   c) at least one of
   i) when the driver requests switch of the automated gearbox from the first mode to the second mode, following the switch order only if, in step b), the vehicle driving behaviour is determined to be satisfactory, and
   ii) when the automated gearbox is in the second driver initiated mode, causing a switch of the gearbox to the first automatic mode if, in step b), the vehicle driving behaviour is determined to be non-satisfactory.

2. Method according to claim 1, wherein in step a), monitoring of the vehicle driving behaviour is made on the basis of at least one parameter representative of at least one of the following quantities:
   instantaneous and/or average fuel consumption,
   engine torque,
   accelerator pedal and/or brake pedal and/or steering wheel movements speed and/or amplitude,
   brake torque and/or brake phases,
   intervention of least one of an anti-blocking system, an electronic stability system, and an anti-slip regulation system,
   vehicle yaw rate,
   vehicle speed as compared to a speed limit, and
   distance to a preceding vehicle.

3. Method according to claim 1, wherein in step a), monitoring of the vehicle driving behaviour is made on the basis of data reflecting the driver's observance of traffic rules.

4. Method according to claim 1, wherein the second driver initiated mode is selected amongst the following modes:
   accelerator pedal kick down mode,
   manual mode,
   temporary manual mode, and
   power/construction mode.

5. Method according to claim 1, wherein steps a) and b) are implemented continuously during a vehicle journey.

6. Method according to claim 1, wherein step a) is implemented continuously during a vehicle journey and step b) is automatically implemented when a request is received to switch the automated gearbox from its first mode to its second mode.

7. Method according to claim 1, wherein, if switch of the automated gearbox is requested and if the vehicle driving behaviour is determined to be non satisfactory, a warning message is sent to the driver.

8. Method according to claim 1, wherein, as long as the vehicle driving behaviour is determined to be non-satisfactory in step b), blocking of any switch order occurs and, if the vehicle driving behaviour is later determined to be satisfactory, a switch order is followed, as long as the vehicle driving behaviour is determined to be satisfactory.

9. Method according to claim 1, wherein, when the vehicle driving behaviour is determined to be non-satisfactory in step b), blocking of any switch order occurs at least for a given period of time or for a given distance.

10. A system for controlling an automated gearbox of an automotive vehicle, the gearbox being adapted to work in:
    a first automatic mode,
    at least one second driver initiated mode which is different from the first mode wherein the system includes, first means to automatically monitor the vehicle driving behaviour, second means to automatically assess whether or not the vehicle driving behaviour is satisfactory, and third means to at least one of i) automatically and selectively block an order to switch the automated gearbox from its first mode to its second mode, wherein the order is automatically and selectively blocked for at least one of a period of time and for a distance, and ii) to automatically and selectively switch back the gearbox from the second mode to the first mode, on the basis of an output of the second means.

11. System according to claim 10, wherein the automated gearbox is an automated manual transmission device.

12. System according to claim 10, wherein the automated gearbox is an automatic gearbox.

13. System according to claim 10, wherein the automated gearbox is a continuous variable transmission.

14. System according to claim 10, wherein the first, second and third means are included in an electric control unit.

15. A vehicle equipped with a system according to claim 10.

* * * * *